United States Patent [19]

Ogino et al.

[11] Patent Number: 4,801,830
[45] Date of Patent: Jan. 31, 1989

[54] BRUSHLESS MOTOR

[75] Inventors: Shigeru Ogino, Kawasaki; Noritsugu Hirata, Yokohama; Tatsuzo Ushiro, Kawaguchi, all of Japan

[73] Assignee: Canon Kabushiki Kaisha, Tokyo, Japan

[21] Appl. No.: 79,211

[22] Filed: Jul. 29, 1987

[30] Foreign Application Priority Data

Aug. 4, 1986 [JP] Japan .................... 61-183021
Aug. 18, 1986 [JP] Japan .................... 61-192574
Dec. 19, 1986 [JP] Japan .................... 61-301514

[51] Int. Cl.$^4$ ............................ H02K 11/00
[52] U.S. Cl. ...................... 310/68 B; 310/268; 310/DIG. 6; 338/32 R; 324/252
[58] Field of Search ............. 310/68 R, 71, 68 B, 310/268, DIG. 6; 318/254, 254 A, 369; 324/252; 29/596; 338/32 R

[56] References Cited

U.S. PATENT DOCUMENTS

| | | | |
|---|---|---|---|
| 4,260,920 | 4/1981 | Nakamura et al. | 310/156 |
| 4,492,922 | 1/1985 | Ohkubo | 338/32 R |
| 4,594,524 | 6/1986 | Sudo | 310/71 |
| 4,599,561 | 7/1986 | Takahashi et al. | 324/252 |
| 4,703,235 | 10/1987 | Wisner | 318/254 |

FOREIGN PATENT DOCUMENTS 45712 4/1979 Japan .

Primary Examiner—Patrick R. Salce
Assistant Examiner—Judson H. Jones
Attorney, Agent, or Firm—Fitzpatrick, Cella, Harper & Scinto

[57] ABSTRACT

A flat brushless motor having magnetoresistive elements includes a flat multipole permanent magnet mounted on a rotary shaft, a yoke member positioned in such a manner as to face the permanent magnet, and coils. The brushless motor also incorporates a plurality of zig-zag patterns of magnetoresistive elements which are formed on a plane perpendicular to the axis of the rotary shaft.

4 Claims, 11 Drawing Sheets (A) RESISTANCE $G_1$ (B) RESISTANCE $G_2$ (C) RESISTANCE $G_3$ (D) COMPOSITE TORQUE (A) CONVENTIONAL COMPOSITE TORQUE (B) OUTPUT FROM MAGNETIC RELUCTANCE MEMBER (C) COMPOSITE TORQUE OF AN EMBODIMENT OF THE PRESENT INVENTION

BRUSHLESS MOTOR

BACKGROUND OF THE INVENTION

Field of the Invention

The present invention relates to a brushless motor, and, more particularly, to a flat brushless motor which has a plurality of spiral coils fixed to a stator yoke, a permanent magnet fixed to a rotor at a position at which it faces the spiral coils, and a sensor element for detecting the rotational phase of the rotor so that current can be supplied to the coils sequentially while being switched over at predetermined timings, to rotate the motor.

Description of the Related Art (i) Brushless motor employing Hall element

FIG. 1 shows a known capstan motor for use in a magnetic recording/reproducing device, as an example of a flat brushless motor of the above-described type. The motor has a stator yoke 1 fixed to a housing 2, a plurality of coils 3 disposed around the circumference of the stator yoke 1, a rotor yoke 4 supported on a rotary shaft 5 by a bush 6, and a multipole magnet 7 mounted on the rotor yoke 4 in such a manner that it faces the spiral coils 3. The motor further includes an FG magnet 8 which is mounted around the periphery of the rotor yoke 4 and consists of magnets disposed at a small pitch, and a magnetic detecting element 9 mounted on the stator yoke 1 which detects variations in the magnetic field generated by the magnet 8 so as to detect the rotation of the rotary shaft 5. A semiconductor magnetoresistive element which detects variations in magnetic reluctance is generally used as the magnetic detecting element 9.

A Hall element 10 is fixed to the stator yoke 1 to detect the phase of the multipole magnet 7 when the rotor yoke 4 is rotated about the shaft 5.

The housing 2 supports the rotary shaft 5 by ball bearings 11 and a metal bearing 12.

In the thus-arranged brushless motor, current is supplied to the coils 3 and is switched at predetermined timings in response to the output of the Hall element 10, to generate a rotational torque and thereby rotate the rotor yoke 4. Assuming that this motor has three phases, it generates a composite torque in the form shown in FIG. 2.

More specifically, if the number of poles of the multipole magnet 7 is n, the coils 3 are disposed on the stator yoke 1 in a state wherein they are separated from one another with respect to the poles of the magnet 7 through a phase angle of $$\frac{360°}{n} \times \frac{2}{3},$$

an electrical angle of 120°. Therefore, the distribution of magnetic flux density in the coils 3 varies in the form of a sine wave wherein the sine waves of the first phase, second phase, and third phase are shifted in the manner shown in FIGS. 2 (A), (B), and (C), respectively. Positive and negative currents are sequentially supplied to the coils 3 in response to the output of the Hall element 10 at timings shown in FIGS. 2 (B) (a), (b), and (c), generating torques shown in FIG. 2 (C) (d). These torques are combined to form a wave-shaped torque which has torque ripples, as shown in FIG. 2 (C) (e).

These torque ripples cause irregularities in the rotation. The relationship between the torque ripples and rotation irregularities is expressed by the following Equation:

$$\Delta N \propto \frac{T}{N^2 \cdot J} \quad (1)$$

where T is the magnitude of the torque ripples; N, the rotational speed of the rotary shaft 5; J, its moment of inertia; and $\Delta N$, the magnitude of the rotation irregularities. Accordingly, if a capstan motor has a low rotational speed N, the torque ripples T tend to increase the magnitude of the rotation irregularities $\Delta N$, causing wow and flutter in low-frequency audio signals or jitter in video signals in a magnetic recording/reproducing device. Conventionally, these problems have been dealt with by increasing the moment of inertia. However, this method runs counter to the tendency of decreasing the weight and size of the entire device.

(ii) Brushless motor with magnetoresistive element

A brushless motor employing a magnetoresistive element is generally constructed as shown in FIG. 3. It has a rotor with a signal magnet 14 which is mounted around the periphery thereof and consists of a magnet having a plurality of poles, a main magnet 16, a rotary shaft 19, and a yoke 20; and an MR (magnetorestrictive) element 13 fixed at a predetermined position to detect the magnetic field generated by the signal magnet so thus detect the rotational speed.

In such a single-point detection system, when the signal's wave-length is short, variations in the detection level are likely to be affected by errors in mechanical accuracy (such as deflection of the shaft or deflection of the outer peripheral surface). Further, a shorter signal wavelength reduces the intensity of the signal's magnetic field, thereby reducing the output of the MR element. Reductions in the moment of inertia and speed of the rotor, which are the results of recent trends in the reduction in size of the motor, are countered by increasing the FG frequency. In the above-described example, this is attained by increasing the number of poles of the magnet mounted around the outer periphery, i.e., by making the wavelength of the signal magnet shorter. However, there is a limit to the decrease in the wavelength, as well as to the reduction in errors in mechanical accuracy, resulting in the occurrence of variations in the detection level and also measurement errors.

A Hall element is generally used as a rotational position detecting means which picks up leakage flux from the main magnet 16 of FIG. 3 and determines the polarities of the magnetic poles to switch over the current supplied to the coils 17 of the motor. The Hall element is generally disposed in, for example, a hole or notch in the stator yoke 18 to pick up the leakage flux from the main magnet 16. However, the provision of the hole or notch in the stator yoke causes variations in motor torque, causing cogging. It also requires a high degree of mechanical accuracy, since an error in the position of the Hall element will cause erroneous switch-over of the current supplied to the coils 17, generating variations in torque. The provision of a hole or notch in the surface which faces the main magnet 16 causes a degradation in rotation irregularities of the motor. The Hall element could be disposed between the magnet and the stator yoke 18, but in such a case, the size or thickness of the element must be taken into consideration if the motor is small and flat. In addition, the motor shown in FIG. 3 has a three-phase, full wave drive, and therefore requires three Hall elements to switch over the current for the coils. This in turn requires a total of eight wires from the Hall elements, which occupies a large space on the wiring board.

SUMMARY OF THE INVENTION

Accordingly, a primary object of this invention is to provide a brushless motor with a magnetoresistive element formed as a positional signal detecting means by a thin film forming technique on a flat base which faces a rotor magnet.

A second object of this invention is to provide a brushless motor which is capable of restraining the generation of torque ripples, which has an improved rotational performance and a reduced weight, and which is therefore suitable for use in a magnetic recording/reproducing device.

A further object of this invention is to provide a brushless motor which allows an MR element for detecting a positional signal required for driving the brushless motor, and an MR element for detecting the rotational speed of the rotor to be formed in the same plane, by a thin film technique.

A further object of this invention is to provide an application of the employment of a magnetoresistive element, and, in particular, a technique of employing a magnetoresistive element in an encoder.

DETAILED DESCRIPTION OF THE PREFERRED EMBODIMENTS

Figure 4:
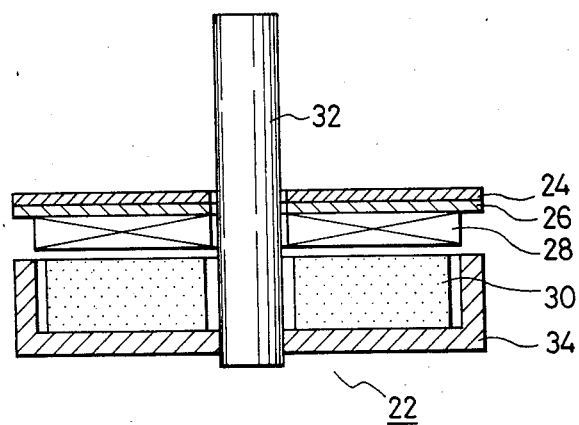
FIG. 4 is a cross-sectional view of a motor incorporating MR elements of this invention, showing a first embodiment thereof.
Figure 5:
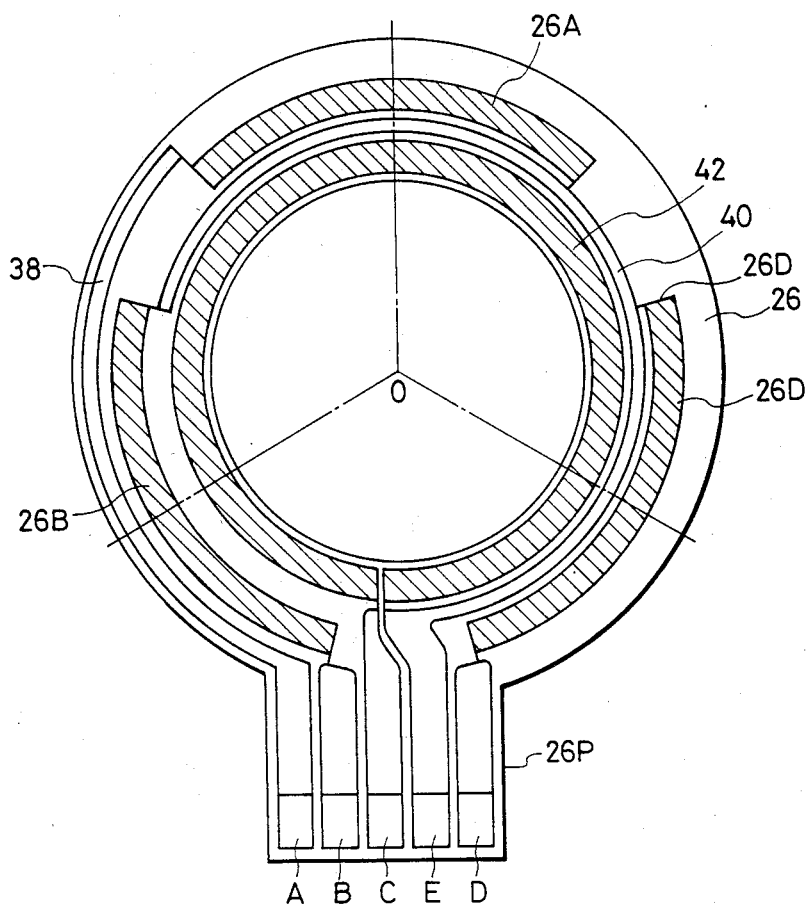
FIG. 5 is a plan view of an MR element pattern formed on a base 26 of the motor of FIG. 4.
Figure 6:
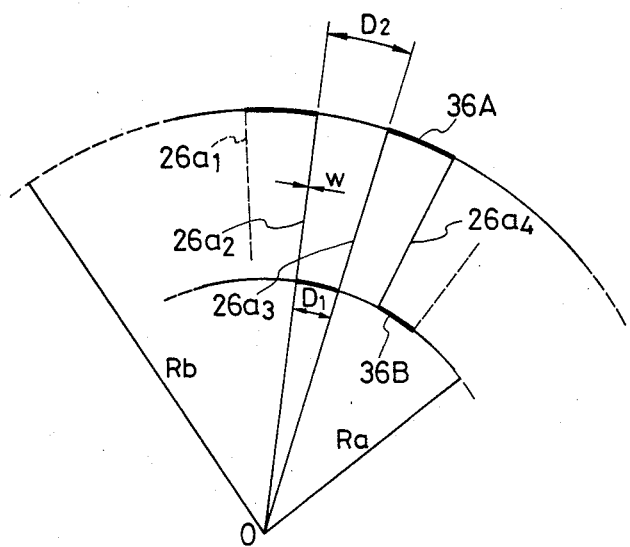
FIG. 6 is an enlarged view of part of an MR element 26A, 26B, 26D, or 42 of FIG. 5.

FIG. 4 is a cross-sectional view of a first embodiment of a motor according to the present invention, FIG. 5 is a plan view of a flat plate on which a magnetoresistive element (MR element) is provided, and FIG. 6 is an enlarged view of a portion of a zig-zag pattern of the MR element.

A motor 22 has a disc-shaped yoke 24 made of a magnetic substance, an MR element retaining base 26 on which an MR element material (shown in FIG. 6) is deposited, and a spiral coil 28 formed by, for example, etching a piece of copper foil fixed to an insulating substrate. The yoke 24, the MR element retaining base 26, and the coil 28 are fixed to one another with an insulating agent interposed between them, to form a stator of the motor. The motor 22 further includes a magnet (Mg) 30 having poles disposed in the manner shown in FIG. 7, an output shaft 32 fitted perpendicular to the magnet 30, and a rotor yoke 34. The output shaft 32, the magnet 30, and the rotor yoke 34 are combined to form a rotor. The output shaft 32 is rotatably fitted into the stator by a bearing member which is not shown.

Turning to FIGS. 5 and 6, the MR element will now be described in detail.

An MR element material is deposited in the manner shown in FIG. 6 on the base 26, such as a printed wiring board, after the base has been insulated, to form a pattern of the MR elements.

MR elements 26A, 26B, 26D, which form position detecting elements, are distributed at mutual angles of 120° around a center O of the output shaft. Each of the MR elements 26A, 26B, and 26C is formed in the manner shown in FIG. 6.

More specifically, the MR element 26A comprises line segments $26a_1$, $26a_2$... fixed to the base by a thin film technique such as deposition or sputtering. These line segments extend between concentric circles of an inner diameter side radius Ra and an outer diameter side radius Rb whose center O is the center of the output shaft, and at a spacing which consists of an inner diameter side pitch $D_1$ and an outer diameter side pitch $D_2$. The inner and outer diameter ends of the line segments of each MR element are connected in series by conductors 36B, 36A, respectively.

The other MR elements 26B and 26D are formed in the same manner as the MR element pattern 26A. A terminal portion 26P, from which signals are fetched, projects from the circular base 26. The terminal portion 26P is provided with terminals A, B, C, D, and E used to deliver signals. The terminal A is connected to a conductor 38 disposed on the outermost portion of the base, which is in turn connected to a portion of either the inner or the outer diameter end of the MR element 26A. The other end of the MR element 26A is connected to a conductor 40, which is in turn connected to a ground terminal E. One end of the MR element 26B is connected to the terminal B, and the other end thereof is connected to the ground terminal E through the conductor 40. One end $26D_1$ of the MR element 26D is connected to the conductor 40, while the other end is connected to the terminal D.

Thus, the MR elements 26A, 26B, 26D are connected between the terminals A, B, and D and the ground terminal E, respectively. A rotational speed detecting pattern 42 is formed in the same manner as the position detecting MR elements. More specifically, the rotational speed detecting pattern 42 comprises MR elements formed in a pattern having a fixed width which is the length (RD−RC) between an inner diameter radius RC and an outer diameter radius RD, of concentric circles whose center is the center O. The upper and lower ends of the MR elements are connected in series by conductors. One end of the rotational speed detecting pattern is connected to the terminal C, while the other end is connected to the ground terminal E.

Let the reluctance of each of the series-connected line segments of each MR pattern be MRk, where k is a number given sequentially to each line segment, starting with 1 for the line segment located at the start point and continuing with 2, 3 and so on. More specifically, assuming that l line segments are connected in series from the start point to the end point, the resistance of each of the line segments is $MR_1$, $MR_2$, ... $MR_k$, $MR_l$, from the start point.

Figure 7:
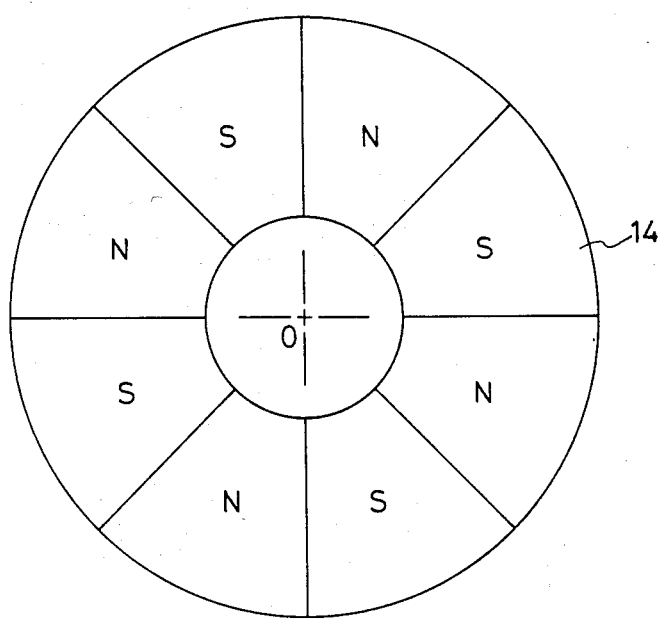
FIG. 7 shows the distribution of poles of a magnet 30 of the motor of FIG. 4.

FIG. 7 shows the surface of the main magnet 30 which faces the MR patterns. The main magnet 30 is composed of four pairs of magnets. The inner and outer diameters of the magnet have the same center O, which is also the center O of the MR patterns. The magnet may have a number of poles other than 8.

If the resistivity of the MR element and the rate of change in resistivity caused by a magnetic field H are $\rho$ and 100γ%, respectively, the signal magnetic field H generated by the main magnet is expressed as follows:

$$H(\theta) = H_0 \sin \theta \text{ (where } \theta \text{ is the electrical angle of the main magnet and } H_0 \text{ is a constant)} \quad (1)$$

$\rho$ is defined as a function of $\theta$ as follows:

$$\rho(\theta) = P_0 - \gamma P_0 \cdot H_1^2 \cdot \sin^2 \theta \quad (2)$$

(where $H_1$ and $P_0$ are constants)
The Equation (2) can be modified as follows:

$$\rho(\theta) = P_0\{(1-\gamma H_1^2/2) + (\gamma H_1^2/2 \cos 2\theta)\} = P_1 + P_2 \cos 2\theta \quad (3)$$

(where $P_1 = P_0(1-\gamma H_1^2/2)$, $P_2 = P_0 \gamma H_1^2/2$)
When the MR elements are aligned at intervals l, the reluctance of each of the line segments is expressed by Equation (3) as a function of $\theta$ as follows:

$$MRK(\theta) = R_1 + R_2 \cos 2\{\theta + (k-1)l\} \quad (4)$$

(where $R_1$ and $R_2$ are constants)
The MR pattern 42 will be described in detail below. The pattern 42 extends around the entire periphery. The number of poles of the main magnet is assumed to be 2N. If m MR elements are connected in series at a space l provided between adjacent MR elements in an area where $0 \leq \theta < \pi$, the total reluctance $MR_{[0,\pi]}(\theta)$ of this area is expressed by Equation (4) as follows:

$$\begin{aligned} MR_{[0,\pi]}(\theta) &= \sum_{k=1}^{m} \{R_1 + R_2 \cos 2(\theta + (k-1) \cdot l)\} \\ &= mR_1 + R_2 \sum_{k=1}^{m} \cos 2(\theta + (k-1)l) \\ &= mR_1 + R_2 \cos 2\left(\theta + \frac{m-1}{2}l\right) \sin ml/\sin l \end{aligned} \quad (5)$$

(where $ml \neq n\pi$ $(n = 0, 1, 2 \ldots)$)

Therefore, the total reluctance of an area $[0, 2N\pi]$ is given by:

$$MR_{[0, 2N\pi]}(\theta) = \quad (6)$$

$$2NmR_1 + 2NR_2 \cos 2\left(\theta + \frac{m-1}{2}l\right) \sin ml/\sin l$$

The total reluctance of the MR elements connected in series between the start point and the end point of the MR pattern 42 is thus a periodic function, and rotational position can be detected by detecting variations in the periodic function.

The MR patterns 26A, 26B, 26C will now be described. The patterns comprise (2n+1) series-connected MR elements. The phase of the (n+1)th MR elements in the individual patterns are displaced from one another by an electrical angle of the main magnet of $(\pi/3 + m\pi)$ (where m=0, 1, 2 ...). In each MR pattern, the elements are connected in series with a spacing given by the electrical angle of the main magnet of d provided between adjacent elements. Accordingly, the total reluctance MRa of the patterns 26A, 26B, and 26D is given by:

$$\begin{aligned} MRa\ ll(\theta) &= (2n + 1) R_1 + R_2 \cos 2\theta + \\ & R_2 \sum_{k=1}^{n} \cos 2(\theta + \\ & (k - 1)d) + R_2 \sum_{k=1}^{n} \cos 2(\theta - (k - 1)d) \\ &= (2n + 1) R_1 + \\ & R_2 \cos 2\theta \left\{ 1 + 2 \sum_{k=1}^{n} \cos(k - 1) \cdot 4d \right\} \end{aligned} \quad (7)$$

Figure 8:
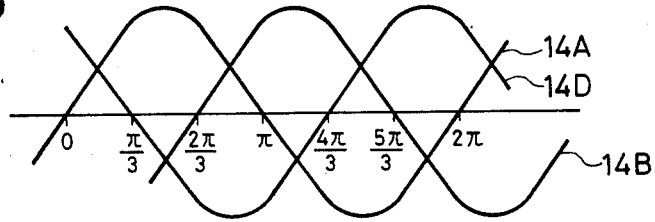
FIG. 8 shows the waveforms of the signals output from terminals A to D.

The MR patterns 26A, 26B, 26D output signals whose waveforms are mutually displaced by an electrical angle of $\frac{2}{3}\pi$ (see FIG. 8). These are rotational position detection signals for the main magnet, and can be used as a basis for switching over the current to be supplied to the coils.

Figure 9:
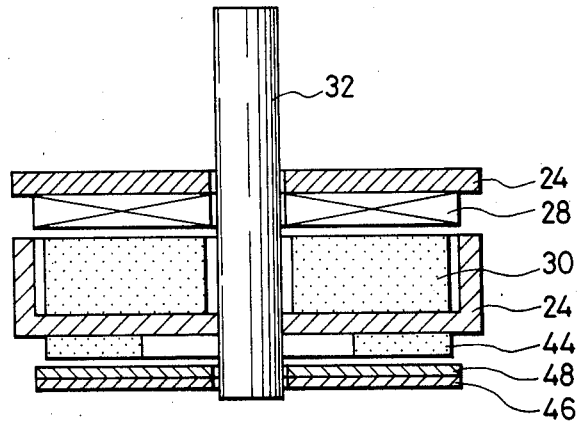
FIG. 9 is a cross-sectional view of a motor, showing a second embodiment of this invention.

FIG. 9 shows a second embodiment of the brushless motor according to the present invention. This exemplifies a case in which the concept of the MR patterns is the same as that of the first embodiment and a high frequency-signal is necessary as a rotational speed detection signal which is output from the rotational speed detecting pattern. The motor has a magnet 44 fixed to the output shaft 32 to which the main magnet is fixed, the number of poles of the magnet 44 being determined as desired.

A rotational speed detecting pattern 48 is deposited on a base 46 fixed to the output shaft 32.

As can be seen from the foregoing description, in the above-described two embodiments, the MR pattern does not comprise a single element but is integral with its elements disposed over a certain area. Therefore, the signals output from the MR pattern are less affected by the effect of uneven distribution or eccentricity of magnet poles, or disturbance, and therefore highly accurate. MR elements employed in these embodiments can be formed by a thin film technique such as deposition on a yoke or a flat plate. This enables the production of a flat, small diameter motor. It can also reduce the number of parts, thereby reducing the production cost.

Since the position detecting signals are output in three phases, it is possible to determine whether the direction of rotation of the motor is normal or reverse.

The surface of the base on which the MR patterns are formed faces the magnet. However, in principle, that base may face the periphery of the magnet. A brushless motor which embodies the second object of this invention will now be described with reference to FIGS. 10 to 16.

Figure 10:
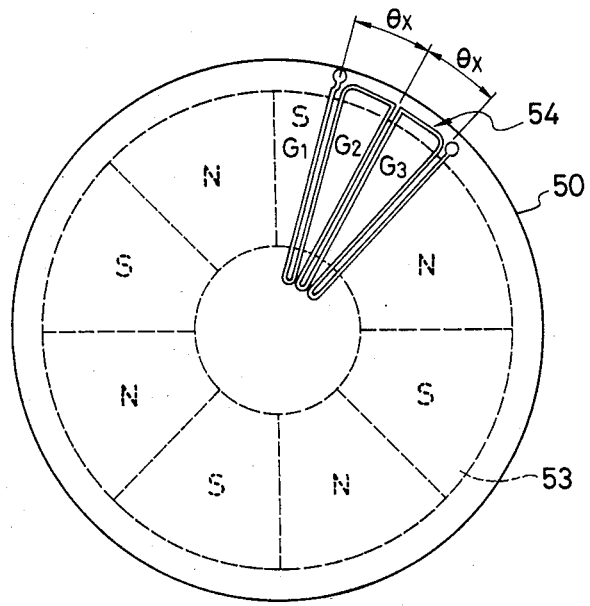
FIG. 10 is a plan view of a stator yoke of a brushless motor.

FIG. 10 shows a third embodiment of the present invention. Semiconductor magnetoresistive elements $G_1$ to $G_3$ are formed as a pattern on a stator yoke 50 at a predetermined pitch angle $\theta x$. In this embodiment, the number n of poles of a multipole magnet 53 is 8, i.e., the pitch angle of each pole is $$\frac{360°}{n} = \frac{360°}{8} = 45°,$$

and the pitch angle of each magnetoresistive element is set to $$\theta x = \frac{360°}{3n} = 15°.$$

Figure 11:
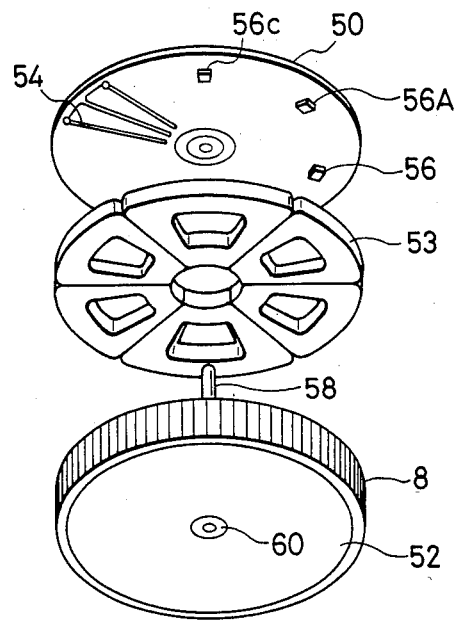
FIG. 11 is a perspective view of the brushless motor of FIG. 10, showing a third embodiment of the present invention.

As shown in FIG. 11, the multipole magnet 53 is fixed to a rotor yoke 52, and Hall elements 56A, 56B, 56C and a magnetic reluctance member pattern 54 comprising the magnetoresistive elements $G_1$, $G_2$, $G_3$ are formed on the stator yoke 50.

Figure 12:
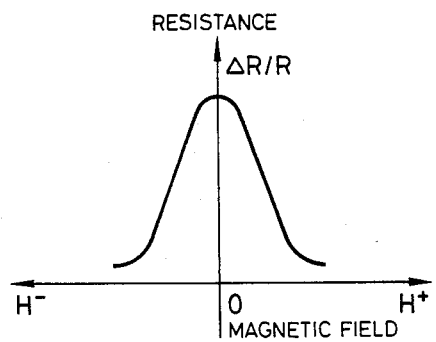
FIG. 12 shows a curve of change in the reluctance generated in a magnetoresistive element formed on the stator yoke.
Figure 13:
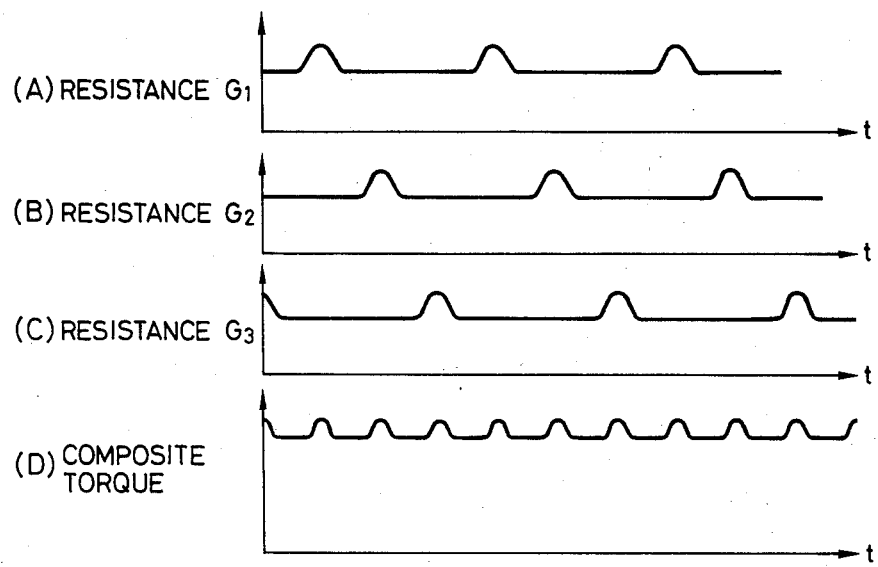
FIG. 13 explains the reluctances generated in a magnetic reluctance member pattern comprising magnetoresistive elements.
Figure 14A:
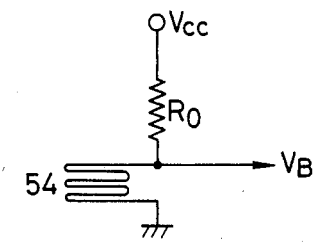
FIG. 14A is a circuit diagram of the magnetic reluctance member pattern.
Figure 14B:
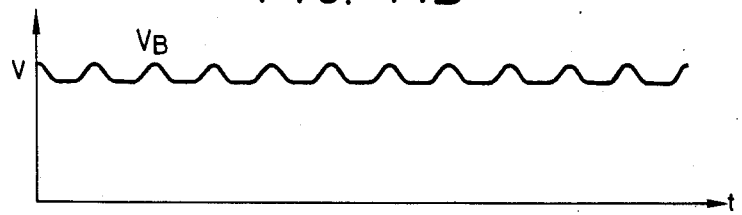
FIG. 14B shows a curve of an output from the magnetic reluctance member pattern.

In the thus-arranged motor, when each N or S pole of the multipole magnet passes each of the magnetoresistive elements $G_1$, $G_2$, $G_3$ during the rotation of the rotor yoke 52, the reluctance R of each magneto-resistive element varies. FIG. 12 is a graph of this change in reluctance $\Delta R/R$. As can be seen from the graph, the change $\Delta R/R$ varies with the intensity of the magnetic field H, irrespective of the direction of the magnetic field H (i.e., the larger the intensity of the magnetic field, the smaller the change), with the change being a maximum when the magnetic field H is zero. Accordingly, the magnetoresistive elements $G_1$, $G_2$, $G_3$ each output a signal every time a boundary between N and S poles of the multipole magnet 53 passes them, resulting in the outputs shown in FIGS. 13 (A), (B), (C), respectively. This results in turn in the output of the magnetic reluctance number pattern 54 whose waveform is shown in FIG. 13(D). If the magnetic reluctance member pattern 54 is constructed in the manner shown in FIG. 14A and is energized with a sufficiently large resistance $R_0$ inserted between the output and a reference voltage Vcc, the pattern produces a voltage $V_B$ such as that shown in FIG. 14B which has ripples.

Figure 15:
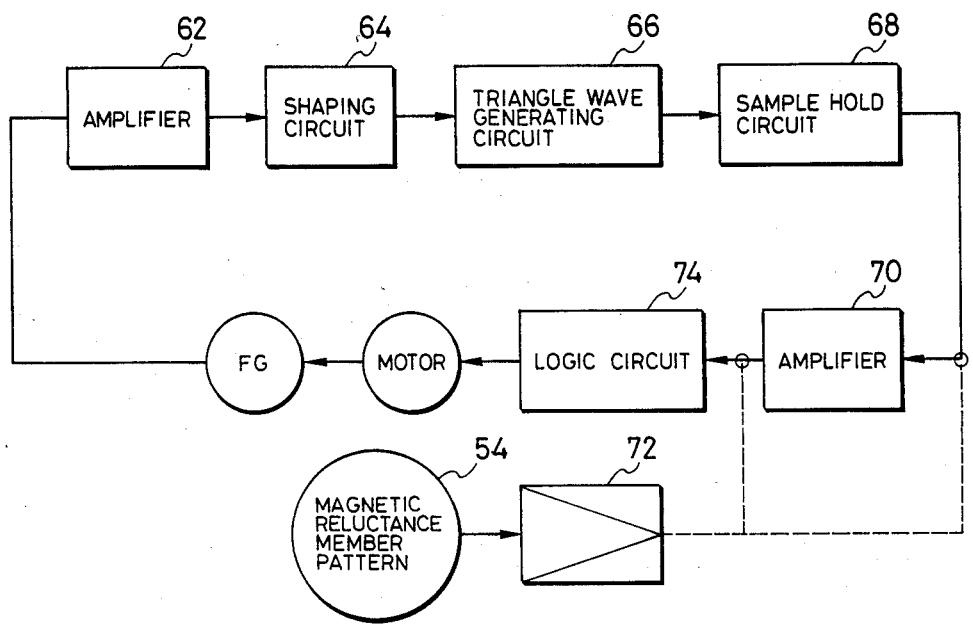
FIG. 15 is a circuit diagram of a control circuit of the brushless motor of the third embodiment.

FIG. 15 shows a control circuit for the brushless motor of this embodiment. The control circuit includes an FG amplifier 62, a waveform shaping circuit 64 for converting the waveform of a signal to a rectangular form, a triangular wave generating circuit 66, and a sample hold circuit 68. When the motor is rotated, the outputs of the FG of the motor are amplified by the FG amplifier 62 and are then passed through the waveform shaping circuit 64, the triangular wave generating circuit 66, and the sample hold circuit 68 to obtain a rotation control signal.

The resultant rotation control signal is then supplied to a drive amplifier 70 to obtain a drive voltage. In the meantime, the output $V_B$ of the magnetic reluctance member pattern 54 mounted on the stator yoke 50 is amplified by an amplifier 72, and is combined with the drive voltage or the rotation control signal. This composite signal is then supplied to the motor via a logic circuit 74.

Figure 1:
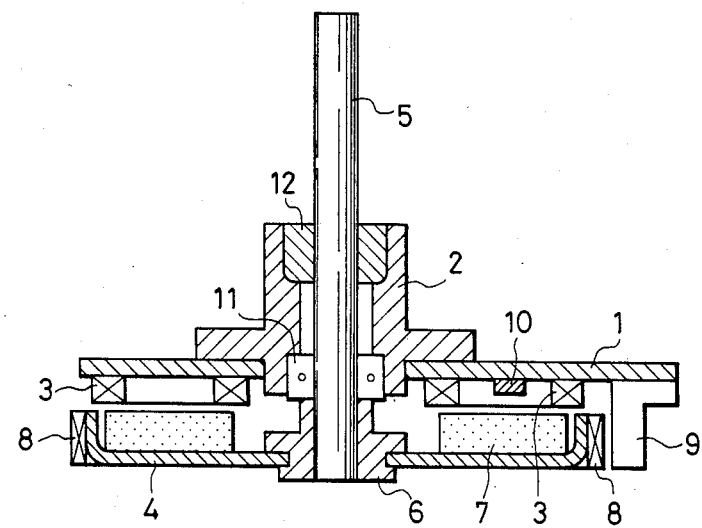
FIG. 1 is a cross-sectional view of a brushless motor with a Hall element.
Figure 3:
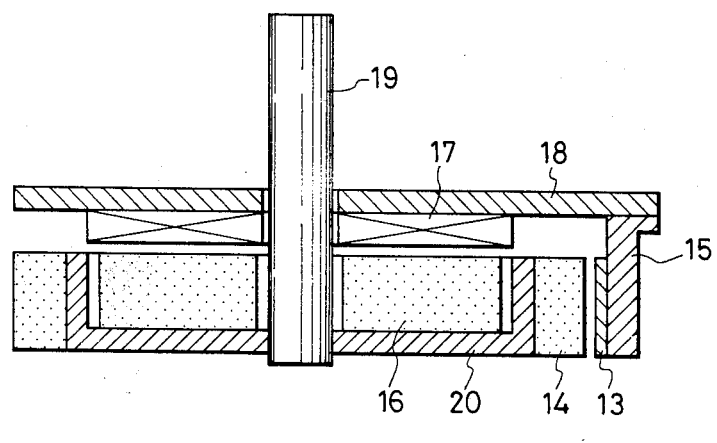
FIG. 3 is a cross-sectional view of a brushless motor with magnetoresistive element.
Figure 2:
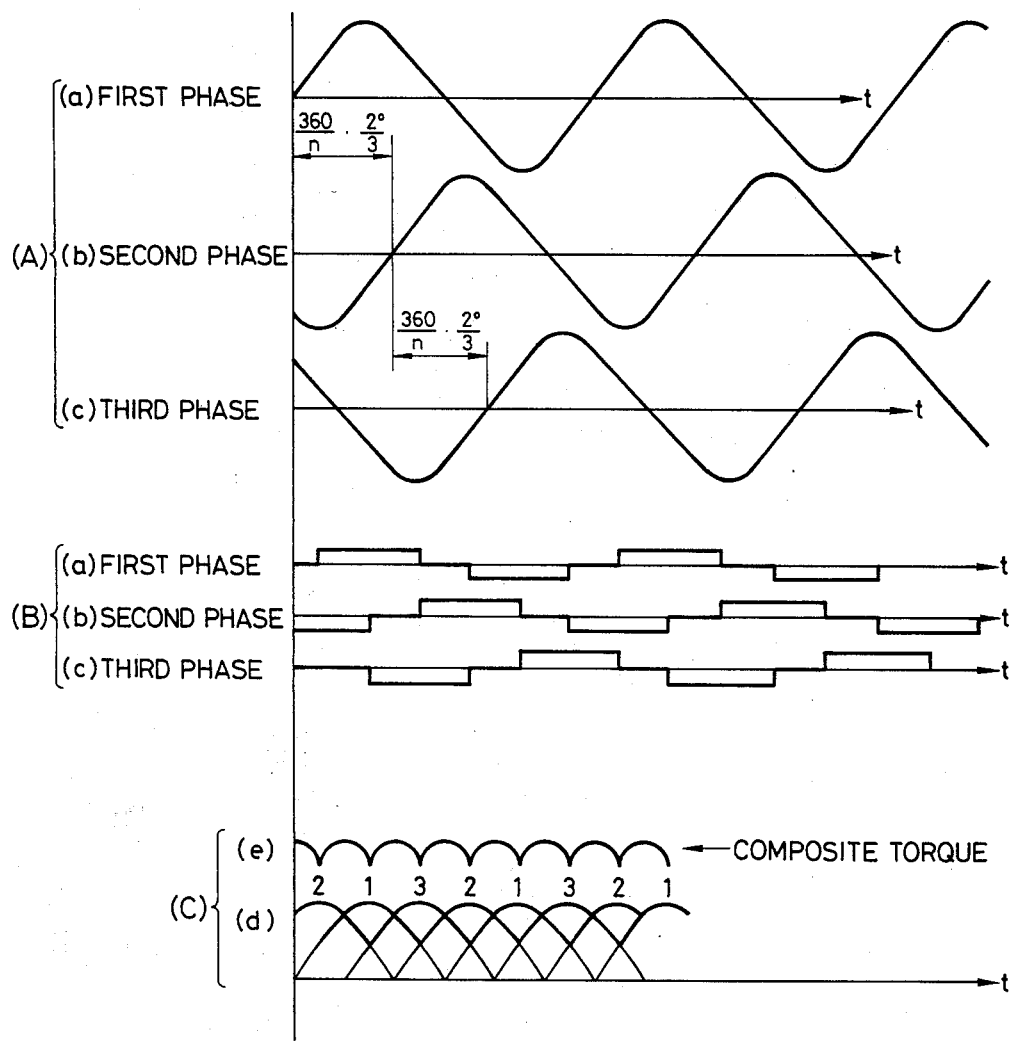
FIG. 2 illustrates the relationships between variations in the magnetic flux generated in coils in a known brushless motor, timings at which current is supplied to these coils, and the form of torque ripples generated in the motor.
Figure 16:
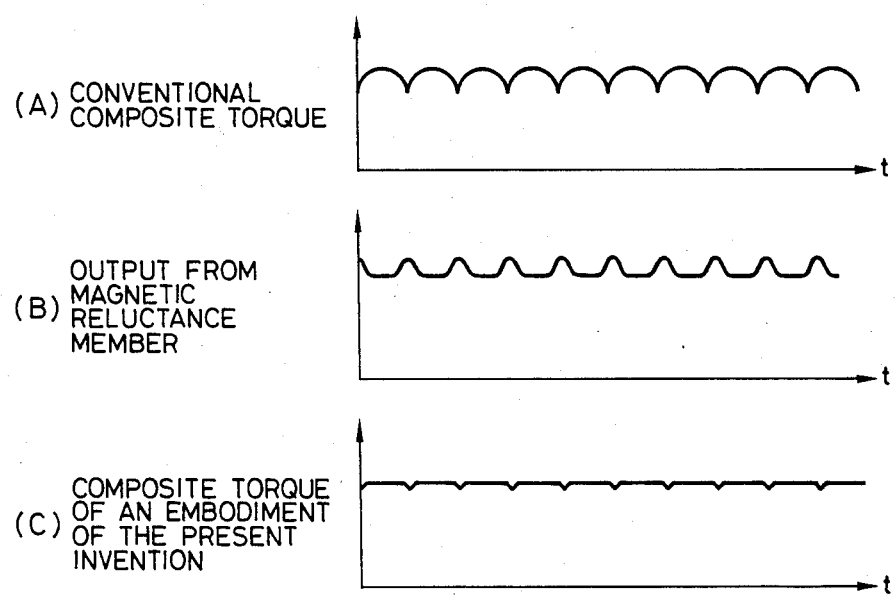
FIG. 16 illustrates the process of suppressing torque ripples which takes place in the brushless motor of the third embodiment.

Since the number of crests of the waveform of the signals which are output from the magnetic reluctance member pattern 54 is 3 times the number n of poles of the magnet 53 while the frequency of the waveform of the torque ripples generated by the motor is also 3n, as has been described with reference to FIG. 2 (C), the above-described circuit construction makes it possible for the torque ripples to be suppressed in the manner shown in FIGS. 16 (A), (B), (C). More specifically, the output of the magnetic reluctance member pattern 54 is in a trough each time the output from the Hall element switches over between an S pole and an N pole, and the phases of the magnetoresistive elements $G_1$ to $G_3$ correspond to those of the Hall elements. Therefore, the torque ripples generated during the drive of the motor can be suppressed by matching the troughs of the torque ripples to the crests of the outputs of the magnetic reluctance member.

In the example described above, the pitch angle $\theta x$ of the magnetoresistive element was 15°. However, it is to be understood that the pitch angle $\theta x$ of 30°, 60°, or 120°, i.e., an electrical angle of 60°, enables a composite reluctance having the same waveform to be generated from a magnetic reluctance member pattern. This means that a magnetic reluctance member pattern comprising at least three magnetoresistive elements disposed by a pitch angle $\theta x$ (which is an electrical angle of 60° when the number of poles of the multipole magnet is n) is enough to generate a composite resistance having a similar waveform and thereby obtain the same effect.

As will be understood from the foregoing description, since torque ripples generated during drive of the motor can be suppressed by superimposing the outputs of the magnetoresistive elements mounted on the stator yoke on the drive voltage of the motor, the torque is kept smooth, and the resultant brushless motor is suitable for use as a lightweight, small capstan motor with a small moment of inertia.

An application of the MR element of this invention to an encoder will be described below with reference to FIGS. 17A to 20.

Encoders of this kind are of two types: magnetic type encoders and optical type encoders. The magnetic type encoder may be further classified as those of the coil power generation type which utilize magnetic induction, and those which employ an MR element.

In an encoder employing an MR element, a pattern of Ni - Fe or Ni - Co is formed by a thin film forming technique, and change in an applied magnetic field is detected by detecting any change in reluctance of these thin film elements. The encoder with an MR element can employ a permanent magnet as a detected body which generates a magnetic field. Therefore, it has a simple structure and improved durability, unlike a photosensor which requires a power source such as LED as well as a light source.

In such an encoder which employs an MR element, the resolution of the output is such that one signal is output for each one or two poles of a magnet. Therefore, for the purpose of having an output with high resolution, the number of poles of a permanent magnet per unit length must be increased, i.e., the pitch of the poles must be decreased.

However, there is a limit to the degree to which the pitch of the poles can be decreased. Further, it is very difficult to do this with high accuracy. These factors make the provision of an encoder having high resolution and accuracy very difficult.

In view of the above-described problems of the prior art, the encoders incorporating an MR element which are given in the following embodiments have high resolution, and are highly accurate.

Such encoders each have a detected body which has poles disposed at a predetermined pitch, and a detecting body comprising a plurality of magnetoresistive effect elements having a saturation magnetic field which is sufficiently smaller than the magnetic field of the detected body, the magnetoresistive effect elements being disposed at a smaller pitch than that of the poles of the magnet in such a manner that they face the detected body.

In any of the above-described encoders, since the saturation magnetic field of the magnetoresistive effect element is sufficiently larger than the magnetic field generated by the magnet, the detection output of the MR element is very steep. Further, it has a high resolution because each pole corresponds to at least one MR element. The MR elements can be formed at a very accurate pitch by photolithography technique, thereby allowing improvements in detection accuracy to be attained.

Figure 17A:
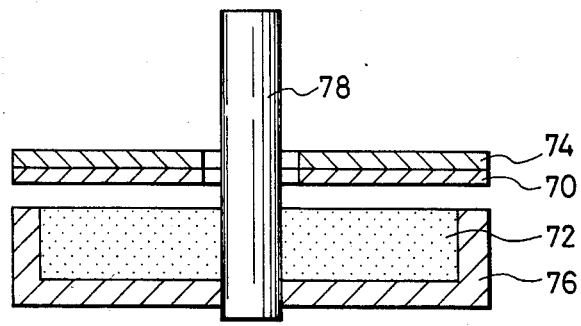
FIG. 17A is a cross-sectional view of a rotational encoder to which the present invention is applied, showing a fourth embodiment of the present invention.
Figure 17B:
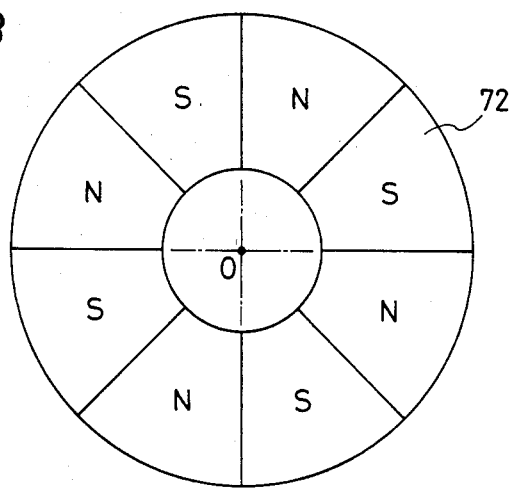
FIG. 17B illustrates a magnet incorporated in the encoder of FIG. 17A.
Figure 17C:
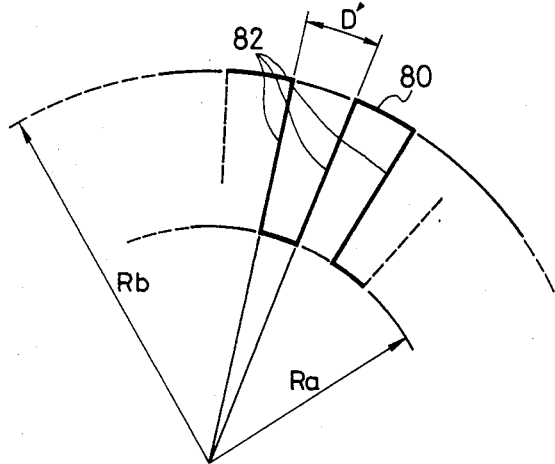
FIG. 17C shows an MR element pattern of the encoder of FIG. 17A.

A fourth embodiment of the present invention will next be described. FIG. 17A is a cross-sectional view of a rotational encoder of this embodiment, FIG. 17B is an illustration of a magnet which is a detected body of the encoder, and FIG. 17C illustrates a pattern of MR elements which form a detecting member.

Turning to FIG. 17A the magnetic flux from a magnet 72 passes through a substrate 70 on which MR elements are formed, then a stator yoke 74, and returns to the magnet 72 after passing again through the stator yoke 74 and the substrate 70. Although the signal magnetic field generated by the magnet 72 can have a sine-wave or trapezoidal form, it is assumed that the waveform of the signal magnetic field of the magnet 72 is in the form of a sine wave. The magnet 72 has 4 N poles and 4 S poles which are disposed alternately in such a manner as to face the substrate 70, as shown in FIG. 17B.

An MR element pattern is formed on the surface of the substrate 70 which faces the magnet 72. It includes MR elements 82, 82 . . . which are formed in a radial form at an angle of D°, and which are connected in series by conductors 80, 80 . . . disposed on the peripheries of circles whose centers correspond with the center O of the magnet 72 shown in FIG. 17 (B), as shown in FIG. 17C.

Let the signal magnetic field of the magnet 72 be given with the phase as a parameter by the following Equation, and let $H_o$ be sufficiently large with respect to the saturation magnetic field $H_s$ of the MR element.

$$H(\theta) = H_o \sin \theta$$

Figure 18:
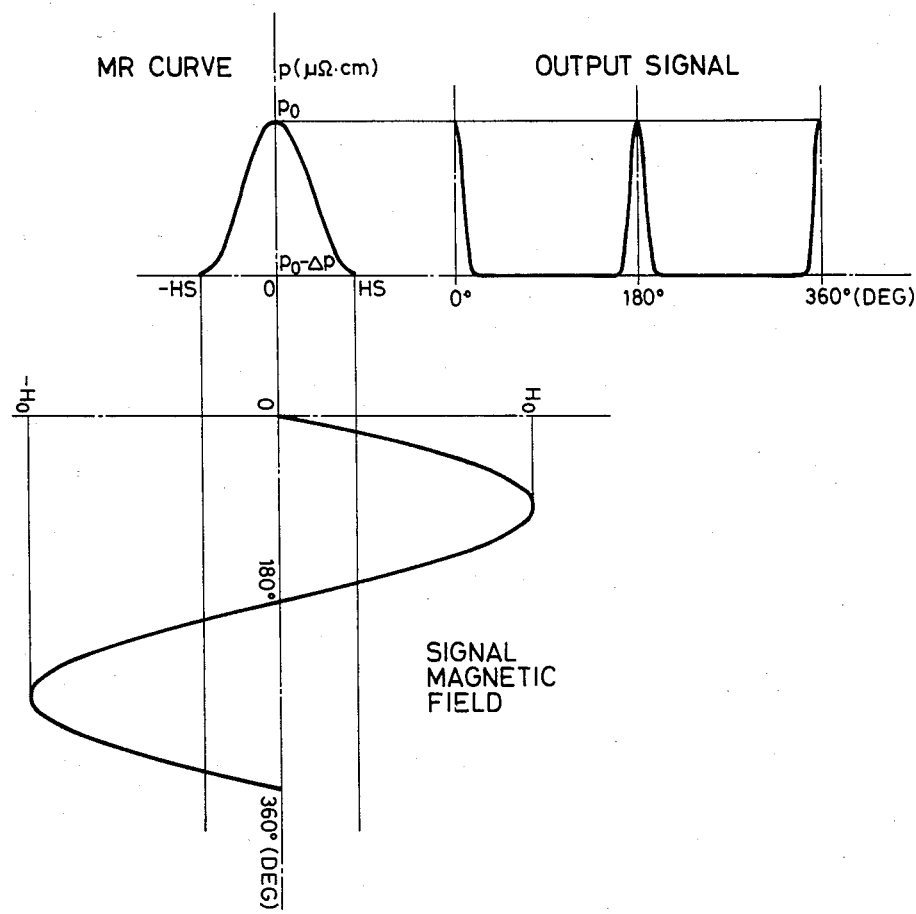
FIG. 18 illustrates the output from each MR element.

FIG. 18 explains the output from each MR element. As can be seen from the illustration, when the signal magnetic field having a maximum value of $H_o$ is applied to the MR element having a saturation magnetic field of $H_s$, the MR element outputs a pulse every phase angle $\pi$ of the signal magnetic field. The width of an output pulse, $\theta_o$, is $2 \sin^{-1}(H_s/H_o)$.

In the encoder of this embodiment, m MR elements in which each MR element ensures the above-described output are connected in series at the same spacing with a phase angle of $n\pi$, as shown in FIG. 17 (C), where n and m are mutually prime and n<m. If the number of poles of the magnet is 2p, the number of pulses PR which are output per revolution of the encoder is 2pm.

If n and m have a common divisor a, namely n=an' and m=am' (where n' and m' are mutually prime), the spacing D between the MR elements is given by:

$$D = n\pi/m = an'\pi/am' = n'\pi/m'$$

This means that in each set of MR element patterns (there are a sets in all), m' MR elements are spaced away from each other at intervals of $n'\pi/m$. In each of the a sets, the output of the MR elements is the same. Therefore, the level of the output pulse becomes a times and this enables any degradation in the output accuracy of the encoder which is caused by variations in the accuracy of the mounting of poles to be reduced by outputting a sets of signals. At this time, the number of pulses output per revolution of the encoder is 2 pm'.

Figure 19:
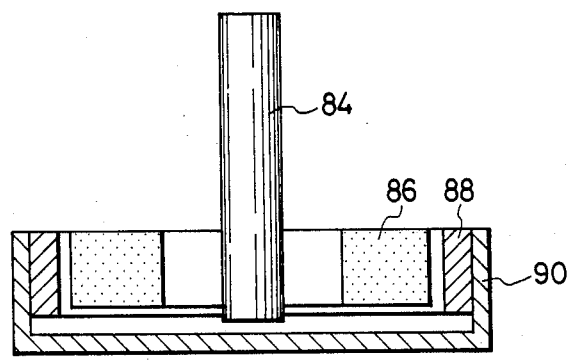
FIG. 19 is a cross-sectional view of an encoder, showing a fifth embodiment of the present invention.

FIG. 19 is a cross-sectional view of a fifth embodiment of an encoder according to the present invention. MR elements are formed on the inner peripheral surface of a cylindrical substrate 88 which faces a cylindrical magnet 86. As in the case of the fourth embodiment, m MR elements are disposed at an angle of $n\pi$ at the same spacing for every phase angle of the signal magnetic field, n $\pi/m$. Similarly, they are connected in series. The number of output pulses per revolution of the magnet is also m times the number of poles of the magnet.

Figure 20:
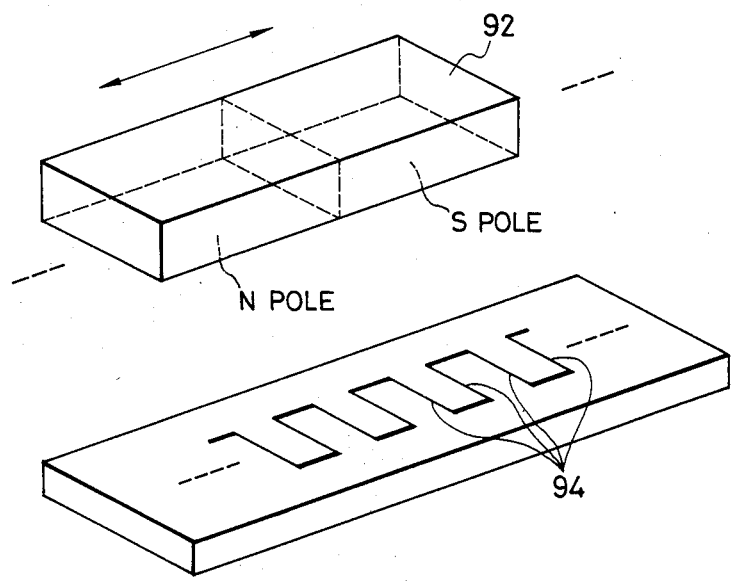
FIG. 20 is a perspective view of a linear encoder, showing a sixth embodiment of the present invention.

FIG. 20 shows a sixth embodiment of this embodiment. In this embodiment, a magnet 92 is linearly moved, and a group of MR elements 94, 94 . . . outputs pulses as the magnet is moved. The magnet 92 is disposed on a plane which faces the MR element group 94, 94 . . . in such a manner that the N and S poles thereof are alternate. If the length of each pair of N and S poles of the magnet is l, m MR elements are disposed in an area of nl by a pitch of n l/m. Therefore, the MR element group outputs 2 m/l pulses per unit length, i.e., the MR element group, outputs m pulses per pole.

The above-described encoder can be employed, for example, as a rotational speed detector for a flat brushless motor. In such a case, the main magnet of the motor can serve as a detected magnet, and a pattern of the above-described MR elements is disposed in such a manner that it faces the magnet. It is therefore not necessary to provide a particular magnet for use in detecting a given rotational speed. This enables reduction in the size of the motor as well as the number of parts required by the motor.

It is possible in any of the encoders of the fourth, fifth, and sixth embodiments to increase the number of output pulses without increasing the number of poles of the magnet, thereby increasing the resolution of the output. Further, it is also possible to reduce degradation in the accuracy of the output signals which are physically caused by the eccentricity or irregularity of the mounting of poles by connecting in series MR elements disposed in a plurality of sets in such a manner that they each output the same pulse.

This in turn enables the provision of a magnetic encoder which has high resolution and is highly accurate.

What is claimed is:

1. A brushless motor comprising a rotor having a rotary shaft to which a permanent magnet having a plurality of poles is fixed, and a stator having a yoke member for rotatably supporting said rotary shaft, said yoke member having coils mounted thereon,
    zig-zag patterns of magnetoresistive elements disposed on the surface of said yoke which faces said permanent magnet substantially at the same spacing from each other around the axis of said rotary shaft and located in the field of said permanent magnet, said magnetoresistive elements being connected by signal outputting conductors, said magnetoresistive elements being in patterns for detecting the rotational position of said rotor,
    said position detecting magnetoresistive elements being disposed in such a manner that the dividing line at an angle of 120° corresponds to the center of each pattern and that each pattern expands from the center in two directions by about 45°, and said zig-zag patterns each comprising line segments expanding between concentric circles of a radius $R_b$ and a radius $R_a$ whose center is the center of said rotary shaft and disposed around said center substantially at the same pitch in a radial form, said line segments of each magnetoresistive element being connected by conductors.

2. A brushless motor according to claim 1, including zig-zag patterns of magnetoresistive elements which are disposed on at least one of the inner and outer sides of said magnetoresistive elements for detecting the rotational position and hence detecting the rotational speed of said rotor.

3. A brushless motor which is an N-phase motor comprising a rotor yoke having a multipole magnet having n poles, and a stator yoke which rotates said rotor yoke, and:
    a magnetic reluctance member pattern including at least three magnetoresistive elements circumferentially disposed on the surface of said stator yoke which faces said multiple magnet at an electrical phase angle of 180°/N and connected to suppress torque ripples generated during drive of the motor.

4. An encoder for detecting the relative position of a detected body and a detecting body comprising:
    a detected body having magnetic poles disposed at a predetermined pitch, along a path of movement relative to a detecting body, and a detecting body comprising a plurality of magnetoresistive elements having a saturation magnetic field which is smaller than the magnetic field of said detected body, said magnetoresistive effect elements being disposed at a smaller pitch along said path of relative movement than that of said poles in such a manner that they face said detected body.

* * * * *

UNITED STATES PATENT AND TRADEMARK OFFICE
CERTIFICATE OF CORRECTION

PATENT NO. : 4,801,830

DATED : January 31, 1989

INVENTOR(S) : SHIGERU OGINO, ET AL.

It is certified that error appears in the above-identified patent and that said Letters Patent is hereby corrected as shown below:

COLUMN 2

Line 25, "MR (magnetorestrictive)" should read --MR (magnetoresistive)--.
    Line 28, "detect" should read --detecting--.
    Line 30, "wave-length" should read --wavelength--.

COLUMN 3

Line 22, "rotor" should read --rotor,--.
    Line 49, "terminals A to D;" should read --terminals A to D of FIG. 5;--.

COLUMN 5

Lines 54-57, "$p(\theta)=P_0\{(1-\gamma H_1^2/2)+(\gamma H_1^2/2 \cos 2\theta\}=P_1+P_2 \cos 2\theta$   (3)
    (where $P_1=P_0(1-\gamma H_1^2/2)$, $P_2=P_0\gamma H_1^2/2$)"

should read --$p(\theta)=P_0\{(1-\gamma H_1^2/2)+(\gamma H_1^2/2 \cos 2\theta)\}=P_1+P_2 \cos 2\theta$   (3)
    (where $P_1=P_0(1-\gamma H_1^2/2)$, $P_2=P_0(\gamma H_1^2/2)$--.

UNITED STATES PATENT AND TRADEMARK OFFICE
CERTIFICATE OF CORRECTION

PATENT NO. : 4,801,830

DATED : January 31, 1989

INVENTOR(S) : SHIGERU OGINO, ET AL.

Page 2 of 2

It is certified that error appears in the above-identified patent and that said Letters Patent is hereby corrected as shown below:

COLUMN 7

Line 50, "magneto-resistive" should read --magnetoresistive--.

Signed and Sealed this

Twelfth Day of December, 1989

Attest:

JEFFREY M. SAMUELS

Attesting Officer

Acting Commissioner of Patents and Trademarks